(12) United States Patent
Balsavias

(10) Patent No.: US 10,210,075 B2
(45) Date of Patent: Feb. 19, 2019

(54) SYSTEMS AND METHODS FOR AUTOMATING TEST SCRIPTS FOR APPLICATIONS THAT INTERFACE TO PAYMENT NETWORKS

(71) Applicant: MASTERCARD INTERNATIONAL INCORPORATED, Purchase, NY (US)

(72) Inventor: Peter Balsavias, Creve Coeur, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 163 days.

(21) Appl. No.: 14/707,317

(22) Filed: May 8, 2015

(65) Prior Publication Data
US 2016/0328316 A1    Nov. 10, 2016

(51) Int. Cl.
*G06F 11/36*    (2006.01)

(52) U.S. Cl.
CPC ...... *G06F 11/3684* (2013.01); *G06F 11/3664* (2013.01); *G06F 11/3688* (2013.01); *G06F 11/3692* (2013.01)

(58) Field of Classification Search
CPC ............. G06F 11/3684; G06F 11/3664; G06F 11/3688; G06F 11/3692
See application file for complete search history.

(56) References Cited

U.S. PATENT DOCUMENTS

| | | | | |
|---|---|---|---|---|
| 6,301,701 B1 * | 10/2001 | Walker | ............... | G06F 11/3688 702/123 |
| 6,701,514 B1 * | 3/2004 | Haswell | ............. | G06F 11/3664 717/124 |
| 7,614,042 B1 * | 11/2009 | Hardy | ................... | G06F 11/368 717/124 |
| 7,681,180 B2 * | 3/2010 | de Halleux | ......... | G06F 11/3688 714/32 |
| 8,276,123 B1 * | 9/2012 | Deng | .................... | G06F 11/368 717/124 |
| 8,701,092 B1 * | 4/2014 | Colcord | .................... | G06F 9/44 717/124 |
| 9,058,424 B1 * | 6/2015 | Bienkowski | ........ | G06F 11/3668 |
| 9,459,994 B2 * | 10/2016 | Koneru | ............... | G06F 11/3688 |
| 2001/0052089 A1 * | 12/2001 | Gustavsson | ......... | G06F 11/3692 714/38.1 |
| 2005/0223360 A1 * | 10/2005 | Seeman | ............. | G06F 11/3688 717/124 |
| 2008/0086627 A1 * | 4/2008 | Splaine | ............... | G06F 11/3688 712/227 |
| 2008/0282231 A1 * | 11/2008 | R | ........................ | G06F 11/3684 717/127 |
| 2009/0217303 A1 * | 8/2009 | Grechanik | ................ | G06F 8/38 719/320 |

(Continued)

*Primary Examiner* — Chat C Do
*Assistant Examiner* — Douglas M Slachta
(74) *Attorney, Agent, or Firm* — Harness, Dickey & Pierce, P.L.C.

(57) ABSTRACT

Systems and methods are provided for use in testing a target application, including target applications for a payment network. One exemplary method includes generating a test script for the target application, based on at least one requirement of the target application. The test script defines at least one input to the target application and associated with the at least one requirement. The exemplary method further includes binding, in response to a user input, at least one element of the target application to at least one input of the test script.

14 Claims, 9 Drawing Sheets

(56) References Cited

U.S. PATENT DOCUMENTS

| | | | |
|---|---|---|---|
| 2009/0282389 A1* | 11/2009 | Slone | G06F 11/3684 717/124 |
| 2009/0288066 A1* | 11/2009 | Jeong | G06F 11/3664 717/110 |
| 2009/0320002 A1* | 12/2009 | Peri-Glass | G06F 8/38 717/131 |
| 2012/0023485 A1* | 1/2012 | Dubey | G06F 8/30 717/125 |
| 2012/0311471 A1* | 12/2012 | Bullard | G06F 3/048 715/765 |
| 2012/0311539 A1* | 12/2012 | Bullard | G06F 11/368 717/127 |
| 2013/0055194 A1* | 2/2013 | Weigert | G06F 8/10 717/104 |
| 2013/0055213 A1* | 2/2013 | Weigert | G06F 8/10 717/126 |
| 2013/0060507 A1* | 3/2013 | Kianovski | G06F 11/3684 702/123 |
| 2014/0013298 A1* | 1/2014 | Gyure | G06F 8/30 717/106 |
| 2014/0165043 A1* | 6/2014 | Pasala | G06Q 10/0633 717/124 |
| 2014/0181793 A1* | 6/2014 | Kaliappan | G06F 11/3684 717/124 |
| 2014/0195284 A1* | 7/2014 | Purandare | G06Q 10/067 705/7.11 |
| 2015/0089290 A1* | 3/2015 | Dermler | G06F 11/3684 714/31 |
| 2016/0085663 A1* | 3/2016 | Best | G06F 11/3692 714/38.1 |

* cited by examiner

SYSTEMS AND METHODS FOR AUTOMATING TEST SCRIPTS FOR APPLICATIONS THAT INTERFACE TO PAYMENT NETWORKS

FIELD

The present disclosure generally relates to systems and methods for automating test scripts for testing applications, which interface to payment networks.

BACKGROUND

This section provides background information related to the present disclosure which is not necessarily prior art.

Applications for use with payment networks are known. The applications include a variety of different functionalities, often based on inputs from users of the applications, whereby the applications return one or more outputs, such as webpages. After these applications are developed, but prior to releasing such applications, for use by consumers, or other parties associated with the payment networks, the applications are tested to ensure functionalities of the applications work as intended. The testing is generally constructed from screen recordings from use of the applications, by which test engineers define procedures to exercise at least a portion of the functionalities of the applications. When the testing reveals faults, the applications are revised or modified to eliminate the faults, and in some instances, alter the intended functionalities of the applications. Once released, the applications are generally used by consumers, or others, to interact with one or more payment networks. On occasion, the applications are subject to revisions, whereby certain functionalities are added, omitted or altered. After such revisions, the applications are often, but not always, subjected to additional testing, which may be the same and/or different from that of the applications' pre-release testing.

DRAWINGS

The drawings described herein are for illustrative purposes only of selected embodiments and not all possible implementations, and are not intended to limit the scope of the present disclosure.

Figure 1:
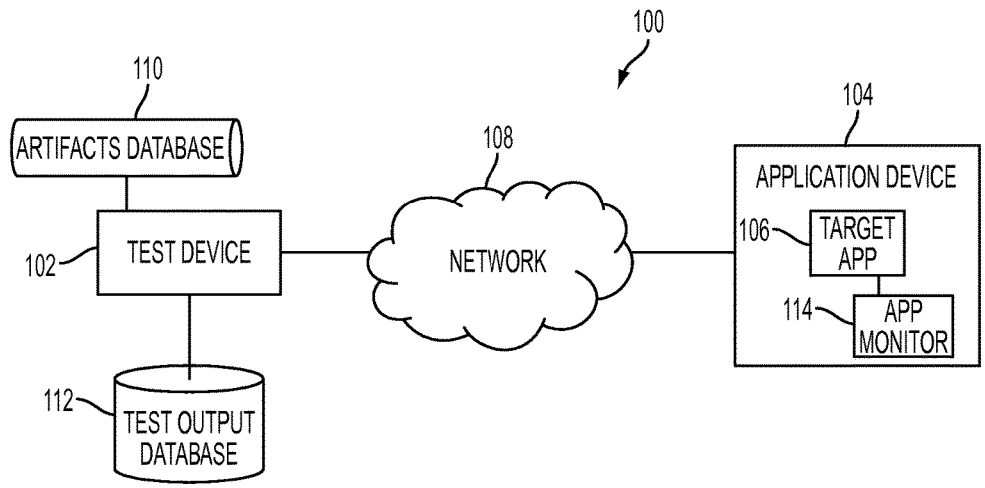
FIG. 1 shows an exemplary system that can be used to manage workflows related to payment account transactions.
Figure 7A:
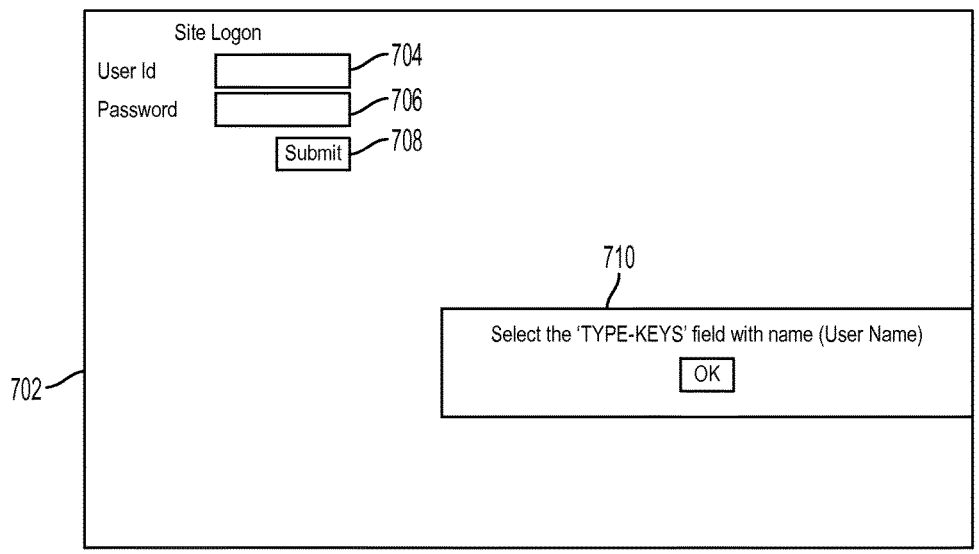
Figure 7B:
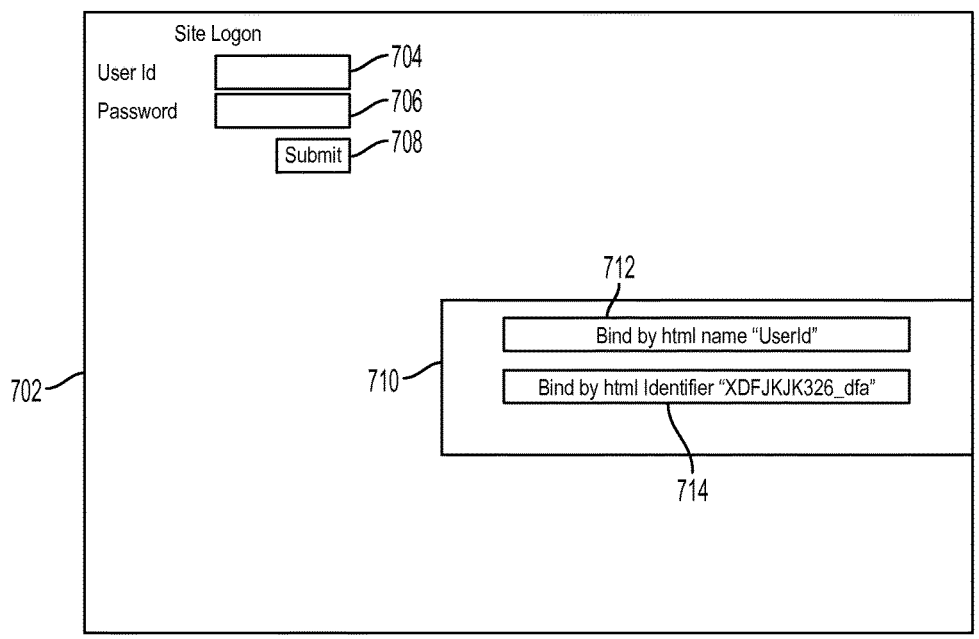
Figures 8, 9A, 9B:
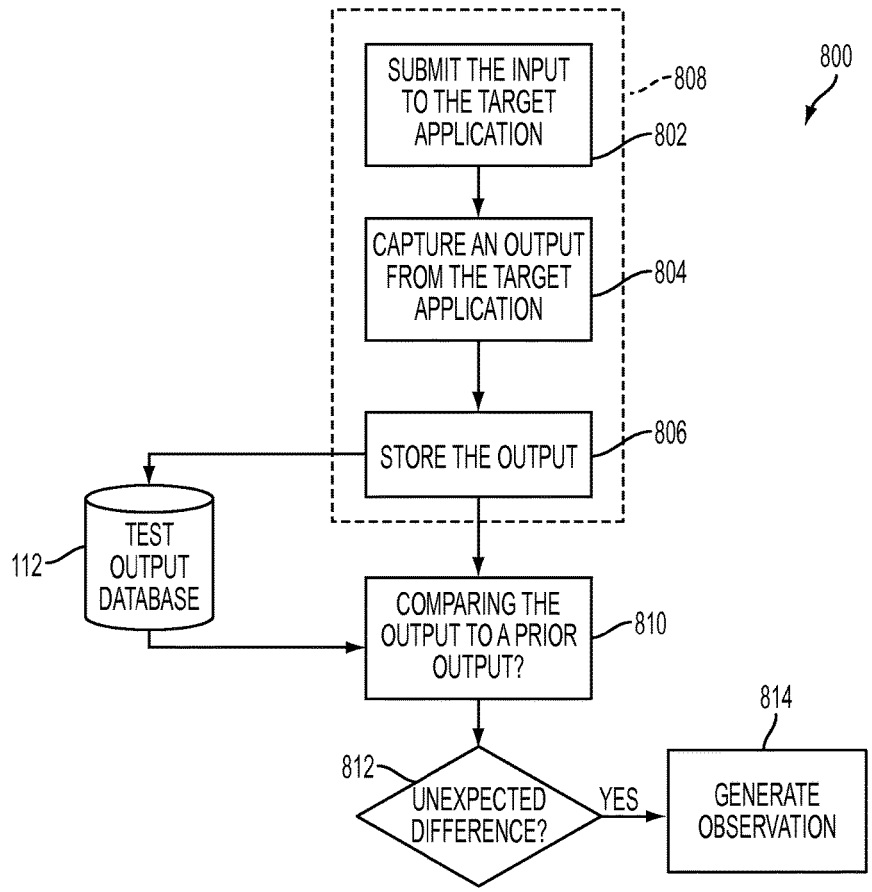
Figure 10:
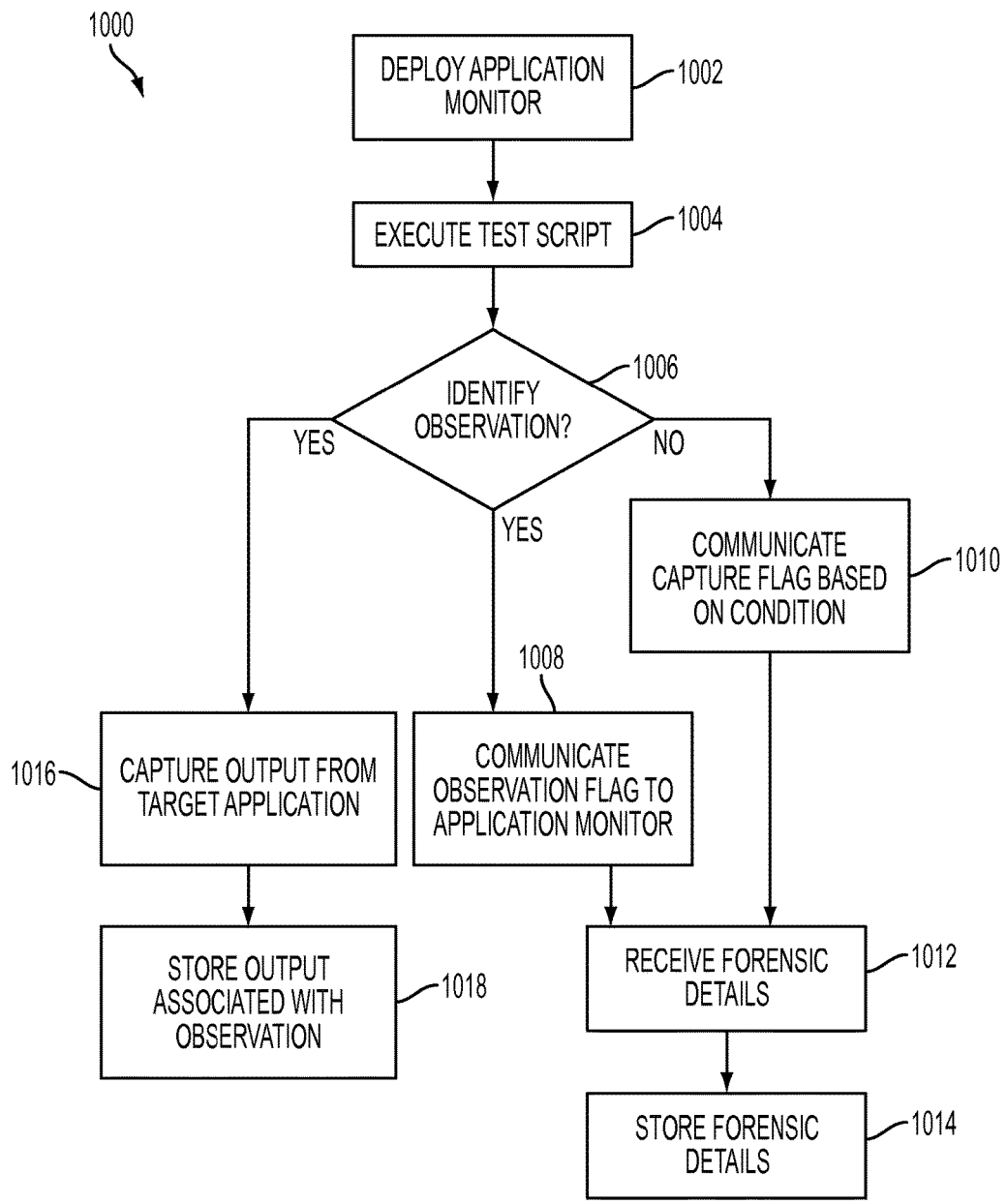
Figure 11:
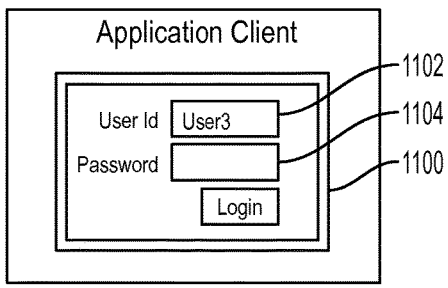

FIGS. 7A-B illustrate exemplary interfaces, provided as part of binding a test script to a target application;

FIG. 8 is an exemplary method for use in testing a target application, which may be implemented in the exemplary system of FIG. 1;

FIGS. 9A-B illustrate exemplary output interfaces, in which an unexpected change occurred;

FIG. 10 is an exemplary method for use in testing a target application, which may be implemented in the exemplary system of FIG. 1;

FIG. 11 is an exemplary interface from a target application; and

Figure 12:
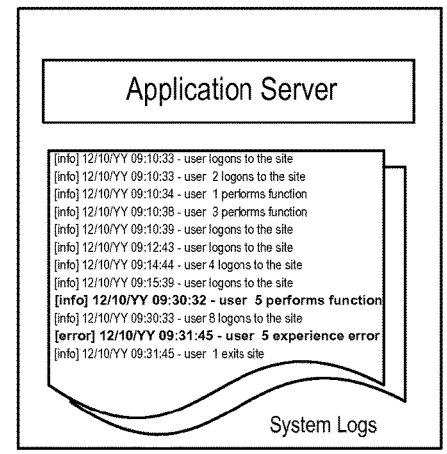

FIG. 12 is an exemplary system log segment, based on a test script interaction with the interface of FIG. 11.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

A target application is often tested prior to release to ensure that the functionality of the application performs as expected. To do so, test sequences are generated for the target application, or versions of the target application, based on the progression of the application, in response to certain inputs. The test sequences are often completed based on screen recordings from the target application, and thus, cannot be constructed until after the target application is complete (or substantially complete). Embodiments of the systems and methods herein, in contrast, permit users to construct test scripts for a target application, based on its requirements, such that the test scripts may be constructed prior to or contemporaneously with the development of the target application. Once each is complete, the test script is bound to the target application, and executed to test one or more of the requirements (e.g., functionalities, etc.) of the target application. The embodiments herein, additionally, or alternatively, compare test outputs to historical test outputs, to identify un-identified changes and/or retrieve or receive forensics details from the server, on which the application is hosted. The systems and methods therefore provide efficient processes for constructing and executing test scripts for target applications, and further efficiencies in considering the outputs of the target applications, and/or behaviors of the application servers, in response to test scripts.

FIG. 1 illustrates an exemplary system 100, in which the one or more aspects of the present disclosure may be implemented. Although components of the system 100 are presented in one arrangement, other embodiments may include the same or different components arranged otherwise, depending, for example, on manners of the types and/or features of applications to be tested, the interactions of the applications with one or more networks (e.g., payment networks, etc.), etc.

The system 100 can be used to test an application, i.e., a target application, which may be directed to or otherwise associated with payment networks, or other networks. Generally, the target application is tested prior to release and/or being deployed for use by the public, consumers, and/or business partners, etc. The target applications include any application installable on a smartphone, or other device or server, a module of a payment network for interfacing, for example, different entities involved in payment transactions (e.g., issuer and/or acquirer banks, etc.), or other applications to which inputs are provided, and outputs are generated, etc. Applications may include different user interfaces for web, web-services, telephony, batch, or mobile operations, etc. One example application includes a web-accessible application for making electronic payments, which interacts with the user through one or more interfaces. The interfaces often include one or more different fields (broadly, elements) for the user to enter or receive information. For example, a login interface may include a field for a username, a field for a password, and a button to "login" to the application. It should be appreciated that any different number and/or type of target applications, whether including one or more interfaces, or not, may be subject to the testing methods and systems described herein.

As shown in FIG. 1, the illustrated system 100 includes a test device 102 and an application device 104. The application device 104, as shown, includes the target application 106 and provides an environment in which the target application 106 is hosted. The application device 104 may include an intended final installation environment for the target application 106, or another environment, in which the target application 106 is hosted for testing, development, and/or other purposes. In at least one embodiment, the test device 102 and application device 104 are included in the same server. As shown, the test device 102 and the applications device 104 are coupled to the network 108. The network 108 may include, without limitation, a wired and/or wireless network, one or more local area network (LAN), intranet, wide area network (WAN) (e.g., the Internet, etc.), other networks as described herein, and/or other suitable public and/or private networks capable of supporting communication among two or more of the illustrated components, or any combination thereof.

The system 100 further includes an artifacts database 110, which includes a plurality of artifacts. Broadly, the artifact database 110 is a library of artifacts, which are generated by one or more different test engineers, in several embodiments, and combined to generate test scripts for different applications. The artifacts define particular interactions, or automation sequences, used in testing the functionalities of different applications. Stated another way, the artifacts are the building blocks of the test scripts, described herein, which are executed by the test device 102, to test the target application 106. In various embodiments, the artifacts database 110 includes sufficient artifacts to generate test scripts for many different applications, of the same or different types.

Artifacts may include any kind of interaction with the target application 106. For example, an artifact may provide certain inputs to a target application, and then evaluate the output as consistent or inconsistent with one or more requirements. For example, a login artifact may test whether a login part of a target application rejects login when a password is invalid. In another example, the artifact may test entering letters into a number only filed (e.g., ZIP code or phone number), or check the format of an input to the field (e.g., MMDDYYY versus MM/DD/YY, etc.), or intentionally leave blank a required field, etc. Artifacts may provide particular evaluations of outputs. For example, an artifact may check the spelling of web-pages, web-service fields, or batch files, etc., from a target application, or validate the html code of an interface from the target application (e.g., check for broken images or links, etc.).

Further, artifacts may instruct the capture and storage of outputs from the target application 106, in response to inputs indicated by the artifact. In the illustrated system 100, the outputs from the target application 106 are stored in a test output database 112. Outputs may include, for example, web-pages, screen-shots, other interfaces, batch files, short-message-service (SMS) messages (or text messages), electronic mail (i.e., email), and/or other types of outputs that may be provided from one or more target applications, as well as further information about the device types, operating systems, versions of software used in combination with the target application (e.g., web browser, etc.), application and/or device settings, log files, etc.

It should be appreciated that any requirement(s) of a target application may be tested through one or more artifacts, either stored in the artifacts database 110 or created in response to a request.

As used in the examples herein, the artifacts generally include steps, scenarios, stories, epics, plans, and schedules. The artifacts, in various embodiments, are organized in a hierarchical manner. For example, a scenario may include one or more steps, a story may include one or more scenarios, and a plan may include one or more epics. Generally, artifacts are included in other artifacts by reference. For example, a login scenario may be included in one or more different stories. In this manner, in such embodiments, the artifacts are built generically, and then used to test a wide range of applications. Additionally, or alternatively, the artifacts are incorporated by reference where a certain artifact or artifacts is used repeatedly in a test script. For example, the login scenario may be used in several different stories, epics, and plans, to test a variety of requirements of the application when the user is logged in. By incorporating it by reference, the scenario artifact, like other artifacts, is not required to be written into the test script several times.

In the described embodiment, a step is a low level component describing an action. When the target application is a web application (e.g., a website, etc.), a step may include, for example, checking the screen state, entering a user-defined value into a field (e.g., a phone number, zip code, username, transaction amount, etc.), or toggling a "Submit" button. A scenario, for example, is built from one or multiple steps and defines separate conditional actions. The scenario generally includes a test case of the target application. The story is a level up from the scenario, and may include multiple scenarios to test a requirement of the application. For example, a story may include a test of the login interface, with three scenarios: login successful, username not recognized, password failed, etc. And, one or more epics then form a plan for testing the application. The plan may be understood to be a software development life cycle (SDLC) release, or a unique regression test cycle of the target application. Specifically, for example, the system, and/or the specific artifact, may include built-in versioning of the plans, steps, scenarios, etc., corresponding to the target application. Finally, the artifact database 110 further includes schedules, which permit a user to arrange, schedule and/or execute one or multiple test plans, epics, stories, scenarios, etc., at particular times, dates, etc., or according to particular sequences.

Figure 2:
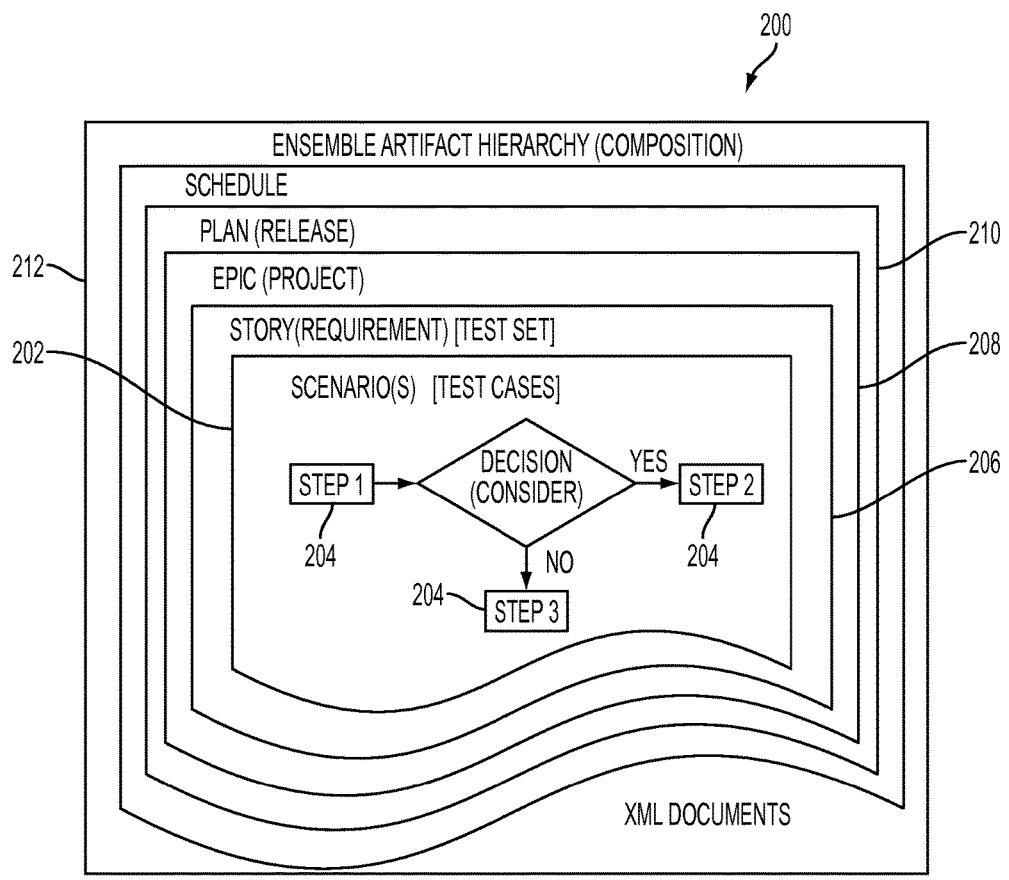
FIG. 2 is an exemplary representation of a hierarchy of artifacts, to be used with the system of FIG. 1.

FIG. 2 includes a representation of the hierarchy of a test script, generally referenced 200. As shown, a scenario 202 includes one or more steps 204. A story 206 includes one or more scenarios 202, and an epic 208 includes one or more stories 206. A plan 210 includes one or more epics 208, and a schedule 212 includes one or more plans 210.

As indicated above, the artifacts, in this embodiment, are general code segments (e.g., defined as html documents, etc.), in which each artifact may be included in each higher artifact. In certain embodiments, one or more variables, such as test inputs to the target applications, are included within the artifacts. Often, however, variables are included through one or more datasets, settings, and/or functions, which are incorporated by reference into the artifacts. In this manner, the datasets, settings, and functions, stored in the artifact database 110, may be changed, or altered to a particular target application, without modifying the artifact. In this embodiment, datasets are sets of variables, which are used in conjunction with certain artifacts to test the target application, so that a plan, for example, may be executed multiple different times for the target application 106, and the same results are expected each time (subject to target application revisions). For example, when a target application is designed to handle prepaid debit card loading for multiple financial entities and/or currencies, datasets incorporated into the plan, for example, may include multiple different consumers and currencies. When the plan is executed, the datasets are employed to provide different permutations of consumers and/or currencies, for which the outputs are extended to be the same regardless of when the plan is executed. The datasets, in some examples, include complex data structures, which may be tables and/or fields in a relational data structure. In addition to datasets, the settings are included to define configurations, internally defined and/or externally defined, by, for example, the system 100, the user, and/or the environment. The settings may be, for example, application settings.

In certain embodiments, the settings artifacts define a hierarchy of settings, whereby certain settings may be overwritten by other settings. For example, a global setting may be overwritten by a user-specific setting, thereby enabling broad configurability of the target application, often as it would be used by multiple different users after release. Settings may, for example, define browser version and setup, as well as plan settings related to connectivity, integration with defect tracking, and timeout settings for the steps, scenarios, plans, etc. It should be appreciated that the scheduling of plans, epics, scenarios, etc., within a test script, may further be modified with different datasets and/or settings in a variety of embodiments. For example, some test plans may be executed for a particular target application with a variables set according to a global.dataset artifact, and then again with a user1.dataset artifact and then with a user2.dataset artifact A user will often design the datasets, and settings, to test different interactions with the target application 106. The hierarchy and independence of the test script, however, permits the test script of be modified for different datasets, settings, or (as described below) revisions to the target application, without re-writing or modifying each of the lower level artifacts. This ability, of the exemplary embodiment shown in FIG. 1, demonstrates the referential function of the framework.

Moreover, functions, in a variety of embodiments, may be defined by test engineers, developers, etc., which may be referenced in other artifacts in the artifact database 110. Functions often include actions, the underlying implementation class, and further outline the expected input (e.g., parameters, etc.) and output (e.g., results, etc.). More generally, functions are defined, atomic, reusable algorithms, generic to the framework, yet support and are leveraged by the underlying artifacts (e.g., plans, scenarios, steps, etc.). Example functions include instructions to capitalize words, generate a random cardholder name, generate a random international address, etc.

In this exemplary embodiment, the artifact database 110 includes artifacts named according to type, such as for example, *.story, *.epic, *.plan, *.dataset, and *.settings, etc. For example, "tesmyapp.plan" and "myuserinfo.dataset" are names of a plan and a dataset in the system 100. It should be appreciated that a variety of different naming conventions and/or extensions may be employed in one or more embodiments. Often, the name of the artifact will be indicative of the function, or data, of the artifact. Regardless of the naming convention, the artifacts, as explained above, are stored in the artifact database 110.

Figure 3:
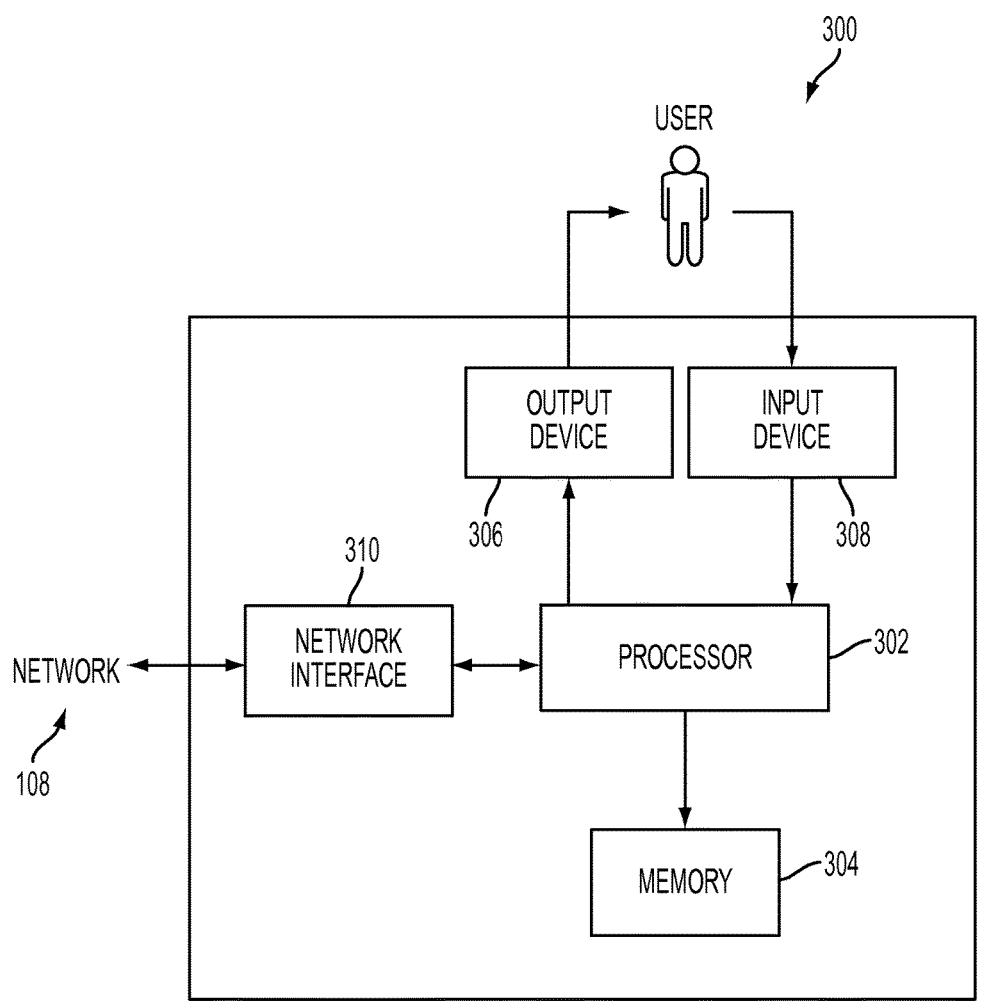
FIG. 3 is a block diagram of an exemplary computing device, suitable for use in the exemplary system of FIG. 1.

FIG. 3 illustrates an exemplary computing device 300. In the exemplary embodiment of FIG. 1, each of the test device 102 and the application device 104 is consistent with computing device 300. The computing device 300 may include, for example, one or more servers, personal computers, laptops, tablets, PDAs, telephones (e.g., cellular phones, smartphones, other phones, etc.), POS terminals, etc., as appropriate.

The system 100, and its components, however, should not be considered to be limited to the computing device 300, as described below, as different computing devices and/or arrangements of computing devices may be used. In addition, different components and/or arrangements of components may be used in other computing devices. Further, in various exemplary embodiments the computing device 300 may include multiple computing devices located in close proximity, or distributed over a geographic region. Additionally, each computing device 300 may be coupled to a network (e.g., the Internet, an intranet, a private or public LAN, WAN, mobile network, telecommunication networks, combinations thereof, or other suitable networks, etc.) that is either part of the network 108, or separate therefrom.

The exemplary computing device 300 includes a processor 302 and a memory 304 that is coupled to the processor 302. The processor 302 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and thus are not intended to limit in any way the definition and/or meaning of processor.

The memory 304, as described herein, is one or more devices that enable information, such as executable instructions and/or other data, to be stored and retrieved. The memory 304 may include one or more computer-readable media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, flash drives, hard disks, and/or any other type of volatile or nonvolatile physical or tangible computer-readable media. The memory 304 may be configured to store, without limitation, artifacts (e.g., the artifacts database 110, etc.), outputs from the target application 106, test scripts, other types of data suitable for use as described herein, etc. It should be appreciated that the artifact database 110 and/or test output database 112 includes memory 304, whether standalone memory, or memory which is incorporated into the test device 102 or another computing device 300. Furthermore, in various embodiments, computer-executable instructions may be stored in the memory 304 for execution by the processor 302 to cause the processor 302 to perform one or more of the functions described herein, such that the memory 304 is a physical, tangible, and non-transitory computer-readable media. It should be appreciated that the memory 304 may include a variety of different memories, each implemented in one or more of the functions or processes described herein.

In the exemplary embodiment, the computing device 300 includes an output device 306 that is coupled to the processor 302 (however, it should be appreciated that the computing device could include other output devices, etc.). The output device 306 outputs to a user (e.g., a test engineer, an applications developer, or other person, etc.) by, for example, displaying and/or otherwise outputting information such as, but not limited to, interfaces, test scripts, artifacts, and/or any other type of data. And in some cases, the computing device 300 may cause the interfaces, provided by a target application, for example, to be displayed at the output device 306 of another computing device, including, for example, the application device 104 executing one or more test scripts, etc. Output device 306 may include, without limitation, a cathode ray tube (CRT), a liquid crystal display (LCD), a light-emitting diode (LED) display, an organic LED (OLED) display, and/or an "electronic ink" display. In some embodiments, output device 306 includes multiple devices.

The computing device 300 also includes an input device 308 that receives input from the user. The input device 308 is coupled to the processor 302 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both output device 306 and input device 308.

In addition, the illustrated computing device 300 also includes a network interface 310 coupled to the processor 302 and the memory 304. The network interface 310 may include, without limitation, a wired network adapter, a wireless network adapter, a mobile telecommunications adapter, or other device capable of communicating to one or more different networks, including the network 108. In some exemplary embodiments, the computing device 300 includes the processor 302 and one or more network interfaces incorporated into or with the processor 302.

Figure 4:
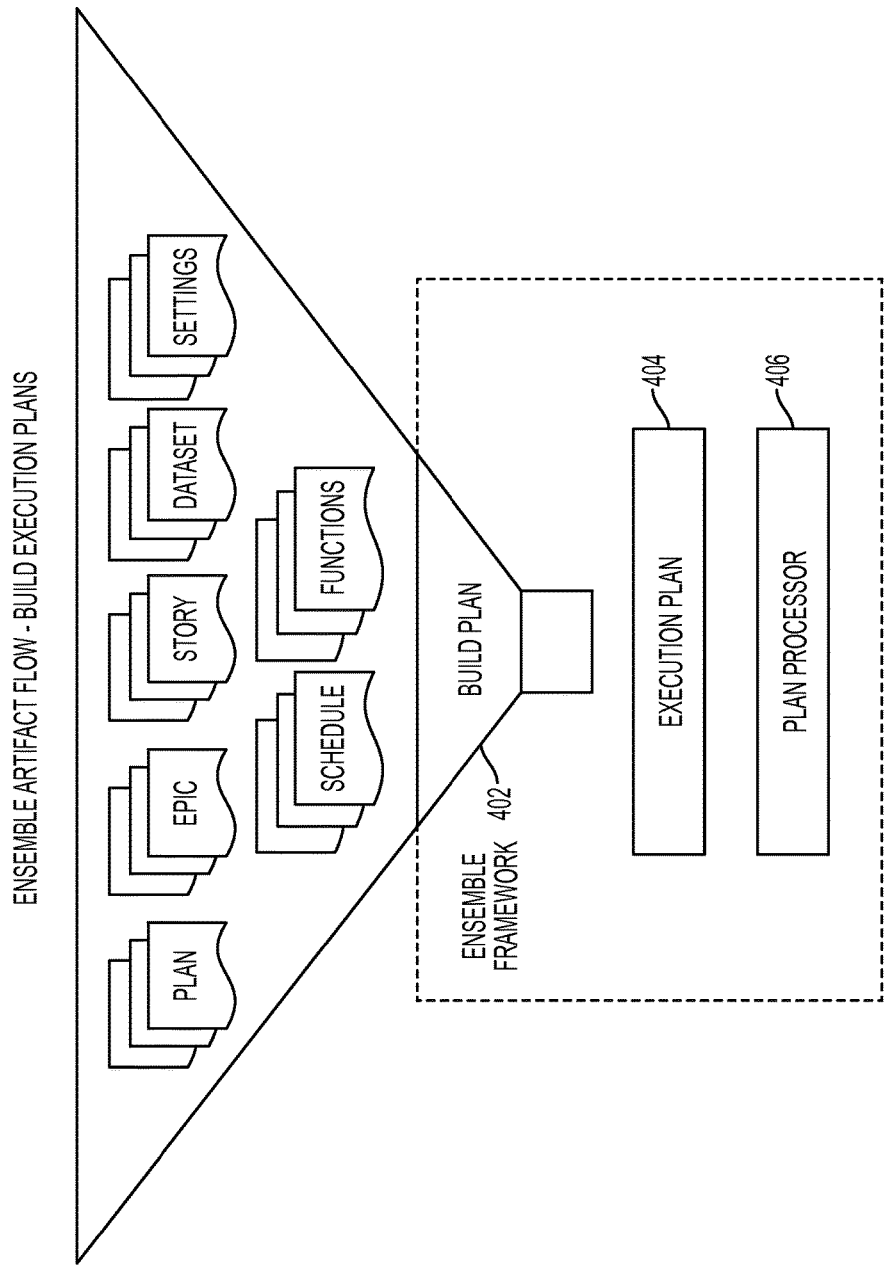
FIG. 4 is a block diagram depicting a generation of a test script from artifacts.

Referring again to FIG. 1, when the target application 106 is identified for testing, a user designs a test script for the target application 106, using the artifacts from the artifact database 110, to test one or more requirements of the target application 106. For example, the test script may include multiple different plans (incorporating multiple epics, stories, scenarios, steps, etc.). FIG. 4, for example, represents flow of the artifacts into the test script. Generally, the user (e.g., a test engineer, etc.) defines a build plan 402, which includes one or more workflows, edit checks, data entries, at least in part, intended to exercise each of the functionalities (e.g., requirements, etc.) of the target application 106, or a part thereof. While it is conceived that certain artifacts will be used without modification, it is also conceived that in generating the test script, to reach each or some of the requirements of the target application 106, the user modifies certain ones of the artifacts. In various embodiments, of course, as the artifacts database 110 includes further artifacts, fewer artifacts will need to be created to generate a test script for a particular target application, as defined by the build plan. The build plan 402 is supplemented with an execution plan 404, which defines a schedule by which the artifacts are to be automatically executed in a particular sequence or at particular times, to test one, some or all requirements of the target application 106. The user generates the test script by incorporating the artifacts, according to the build plan 402 and the execution plan 404. The plan processor 406 includes the underlying executable instructions that cause the build plan 402 to be executed according to the execution plan 404.

Figure 5:
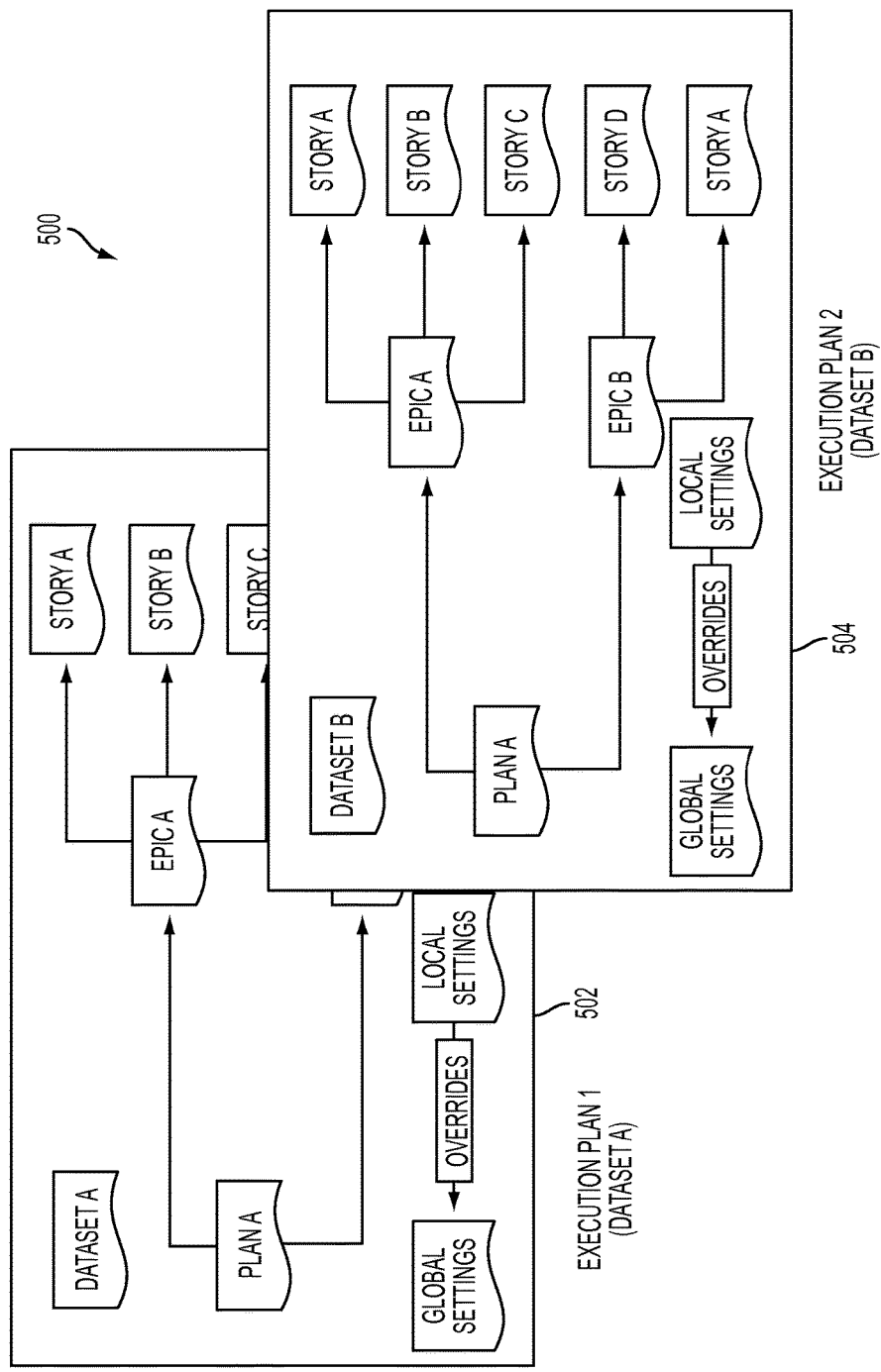
FIG. 5 is a block diagram of two plans relying on different datasets.

FIG. 5 further illustrates the use of datasets and settings between the same artifacts to test one or more requirements of the target application 106. As shown, duplicate plans are included in a single test script, in which a first test plan 502 employs dataset A and the second test plan 504 employs the dataset B. In this manner, different requirements of the target application 106 may be tested with the same plan. In addition to the datasets, the setting between the different plans 502, 504 may be different. As shown, in each plan, the local settings override the global settings. In a different embodiment, the local setting may be different between the two plans, and/or the global setting may override the local settings. It should be appreciated from the above, and the illustrated example of FIG. 5, that the methods and systems herein may be employed in any number of different ways to test target applications as desired by a user.

Because the test script is generated from the artifact database, and based on the expected functionality (broadly, the requirements) of the target application 106, the test script may be generated prior to, or in parallel with, the development of the target application 106. In one example, 80% or more of the test script may be completed, prior to delivery of the target application 106 for testing because it is generated according to requirements, which are the same as (or substantially similar to) those given to the application developers. In this manner, in various embodiments, a time to release of the target application may be reduced over known methods, in which a testing procedure was not constructed until after delivery of the target application, which generally relied on use of the target application to construct the test procedure.

Once the test script is completed, and the target application 106 is also completed, the test script is bound to the target application 106. As described with reference to FIG. 6, below, the test script is bound to the target application 106 by linking the inputs identified in the test script to the fields (or, broadly, elements) of the target application 106. The inputs defined in the test script may be linked by identifier, name attribute, path, etc. In addition, in this embodiment, certain outputs within the test script are linked to the target application 106, whereby the test script is able to test the outputs for conformity to one or more requirements, and/or expected results. Output may include, for example, the resulting field values or presence of data, images, or messages within a screen, or could represent fields in the output of a web service call.

Once the test script is bound to the target application 106, the test device 102 executes the test script (e.g., as commanded by a user, or as scheduled, etc.). The executed test script is directed at the application device 104, and in particular the target application 106. The test device 102, in various embodiments, interacts with the target application 106, as defined by the test script, directly or indirectly, through use of one or more intermediate programs. For example, the test script, as executed by the test device 102, is a front-end for a web-based application, such as, for example, the Selenium web-driver, etc. In certain web-server examples, the test script, again, as executed by the test device 102, utilizes Java API for XML Web Services (JAX-WS) to create user stubs from a web service description language (WSDL), etc. In certain batch examples, custom code of other intermediary programs, as part or separate from the test scripts, may be employed for file processing and/or as extract, transfer, and load (ETL) tools and scripts, etc. The test device 102 may further utilize one or more application program interfaces (API's), such as, for example, REST or SOP-based web-services. While certain examples are provided herein, it should be appreciated that any number of different program modules may be employed as part of, or separate from, the test device 102, to enable execution of the test script, and its interactions with the target application 106, at the application device 104.

As indicated above, depending on the particular embodiments, certain outputs from the target application 106 are stored in the test output database 112. For example, when the target application 106 is a web application, the test script may store interfaces, provided from the target application 106, in the test output database 112. Alternatively, when the target application 106 is a batch process, the test script may store certain batch files in the test output database 112. As described herein, the outputs may be used for a variety of different tasks, including, troubleshooting target applications, or as historical records of target application performance and/or response, in view of the test script. The use of the exemplary test output database 112 is described more fully below.

It should be appreciated that a test script may be generated for a target application and used repeatedly to test the particular requirements of the target application. The test script may be generated to test different requirements of the target application at different frequencies, or with a variety of inputs, settings, etc. When the target application is revised (or more particularly, a requirement is revised), the test script may be modified to test the revised target application by, for example, the addition of artifacts or the exchange of certain artifacts for other artifacts in the artifacts database 110. In addition, the user may spin up multiple instances of the test script, from the test device 102 or other devices, to run parallel or redundant testing of the target application. More generally, in use, a target application may be utilized by dozens, hundred, thousands, etc., of different users at one or more times. The test script may be run in parallel to create multiple different interactions with the target application, thereby providing a more rigorous test for the target application. In at least one example, different instances of the test script rely on different datasets and/or settings. Referring to FIG. 5, for example, the plans 502, 504 may be executed at the same time, through different threads, or sequentially.

Figure 6:
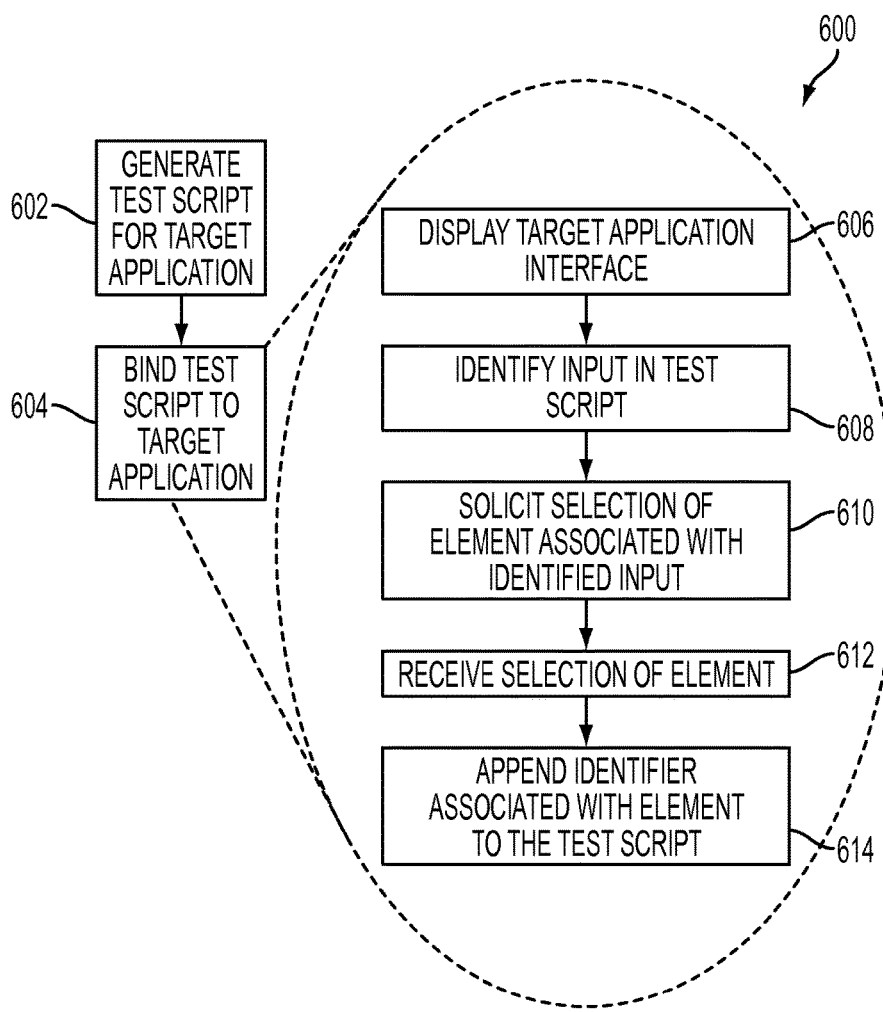
FIG. 6 is an exemplary method for use in testing a target application, which may be implemented in the exemplary system of FIG. 1.

FIG. 6 illustrates one exemplary method 600 for use in testing a target application. The method 600 may be implemented in the test device 102 of the system 100. It should not be understood, however, to be limited to the test device 102, as described above. Conversely, the test device 102 should not be understood to be limited to the method 600.

As shown, the method 600 generally includes generating, at 602, a test script for a target application and binding, at 604, the test script to the target application. The binding, as indicated above, links the test script to the target application, so that the test script provides inputs to the target application properly, and receives outputs from the target application properly. For example, when a test script includes instructions to write a username (i.e., an input) to a username field, binding includes identifying the username input to the corresponding element of the login interface of the target application. Binding is performed, in part, by the test device 102 in the system 100, or by other components (depending on the embodiment), for example, among others, web application pages, web-service calls, batch files, and telephony operations, etc. The binding between the test script and the target application may be based on the type of variable (or aspects thereof) included in the target application, including, in an html example, html identifier, html name, any html attribute, html label tag, html XPAth definition, other path definitions, tab stop (e.g., within a page, etc.), etc. The variable, on which the test script is bound, may be dynamic or static. It should be appreciated that, depending on the type of target application, for example, any type of variable or other input/output to the target application, may be bound to the test script as described herein, by any different type of identifier, so that inputs and/or outputs to/from the target application are properly provided and/or interpreted in the context of the test script.

The binding, in some embodiments, may be completed manually, by a test engineer or another user inserting a designator for the particular element of the target application into the test script. As shown below, in Table 1, for example, an input "Destination Airport" from the test script is bound to an element "airport_id" of the target application, by its html identifier attribute. In such embodiments, the user needs to identify the appropriate variable from the test script and appropriate outputs from the target application prior to binding the two.

TABLE 1

| 1  | <!-- ensemble binding by id --> |
| 2  | <type-keys> |
| 3  |   <type-this>O'Fallon</type-this> |
| 4  |   <into-field name="Destination Airport"> |
| 5  |     <bounded-by> |
| 6  |       <html-id>airport_id</html-id> |
| 7  |     </bounded-by> |
| 8  |   </into-field> |
| 9  | </type-keys> |
| 10 |  |
| 1  | <!-- source html --> |
| 2  | Destination Airport: <input type="text" id="airport_id"> |
| 3  |  |

Additionally, or alternatively, the user binds the test script and the target application as optional steps of the method 600, as indicated by the dotted lines. For example, and with reference to FIG. 7A, at 606, the test device 102 causes a target application interface 702 to be displayed at an output device 306. As shown in FIG. 7A, the interface 702 includes a User Id field 704, a Password field 706, and a submit button 708. As the test device 102 steps through the test script, the inputs of the test script are identified, at 608. When identified, for the interface 702, the test device 102 causes a block interface 710 to be displayed at the output device 306. The block interface 710 solicits, from the user, a selection of the field within the interface 702, which is associated with the identified input, at 610. In this example, the test device 102 solicits the user to identify the field (broadly, element), to which the "User Name" input is to be provided. The user is then able, via an input device 308, to select one of the fields in the interface 702. In this example embodiment, the field selected is visually distinguished, e.g., highlighted, etc. Once selected, the user toggles the "OK" button of the block interface, which identifies the selected field to the test device 102. In turn, the test device 102 receives the selection of the field, at 612, and appends the identifier associated with the field to the test script, at 614. The above steps are repeated for each of the unique fields in the test script. When the steps are completed for each input/output for the test script, the binding of the test script and the target application is completed. When, for the above example, the test script is subsequently executed, the test script will provide the input for "User Name" to the "User Id" field of the target application.

It should be appreciated that binding the test script to the target application, as described herein, permits the test script to be substantially completed in advance of completion of the target application. It is only the binding that is necessary, as described with references to steps 604-614, to be accomplished after the delivery of a complete, or substantially complete target application.

In the example of FIG. 7A, the block interface 710 includes the name of the input "User Name." In another example, illustrated in FIG. 7B, the block interface 710 permits the user to select the manner in which the field is bound to the input of the test script. In particular, the block interface 710 may include the option to bind the "User Id" field 704, by an identifier at 712 and a name at 714. It should be appreciated that in other embodiments, different aspects of the input/output variable may be bound to a target application. The user may select among different aspects of the input/output variable to be bound for a number of different reasons. For example, the user may opt to bind the variable based on a static aspect of the variable, such as, for example, an html identifier, or an html name, etc. In certain embodiments, binding of an identifier, for example, may not be possible, when identifiers are dynamically generated for an interface (e.g., Google® web toolkit (GWT), etc.).

In another example, the test device 102 further offers, to the user, a generic attribute binding mechanism, which may be employed for a variety of different applications, and languages to leverage certain unique occurrences of the input/output variables. For example, the test device 102 may permit the user to bind a component to the identifier or name attribute, and further bind an element by an attribute without a value by excluding the nested with-value tag within the html-attribute tag. In certain embodiments, the test device 102 may provide binding by a component's designated label tag. This binding may be selected by a user, when the label's (text) value is a known value defined by a particular user, such as, for example, a developer or business requirement, but there is no readily available static identifier or name attribute on the labeled html element. For example, the Google® Web Toolkit (GWT) dynamically generates a random field id and the label's matching for attribute. However, the value of the label field is presented as code by a developer. In the example in TABLE 2 below, the test device 102, at the user's selection, binds the label element with the value (between the opening and closing tag) of Destination Airport. It then programmatically gets the for attribute's value to find the corresponding html element with that id—in this case the input field (text box) with an identifier of "randomlygeneratedvalue_0123".

TABLE 2

| 1 | <!-- ensemble binding by html label --> |
| 2 | <type-keys> |
| 3 |   <type-this>O'Fallon</type-this> |
| 4 |   <into-field name="Destination Airport"> |
| 5 |     <bounded-by> |
| 6 |       <html-label> |
| 7 |         <with-label-value> |
| 8 |           Destination Airport |
| 9 |         </with-label-value> |
| 10 |       </html-label> |
| 11 |     </bounded-by> |
| 12 |   </into-field> |
| 13 | </type-keys> |
| 14 | |
| 1 | <!-- source html --> |
| 2 | <label for="randomlygeneratedvalue_0123">Destination Airport:</label> |
| 3 | <input type="text" id="randomlygeneratedvalue_0123"> |
| 4 | |

In the disclosed embodiment, the test device 102, at the user's selection, is also able to bind the text script to a component through an XPath language declaration. XPath language provides a method to declare and locate a component by providing a full path to the desired item when describing, for example, an html webpage as an object tree. In certain embodiments, the test device 102 may offer, and the user may select, to bind with a simple path when there is no statically, uniquely identifiable attribute (e.g., identifier, name, etc.) or a label for an element, yet it is known that the element is always nested within another element that is statically and uniquely identifiable. For example, the test device 102 identifies a tag with a name "div" and with an id attribute that has a value of my_unique_id. From there, it locates the second occurrence nested input tag with a type attribute containing the value of text. This binding option often requires the user to use multiple XML tags to find an element. This binding option further provides support for multiple layers of nesting to locate a particular element. Finally, the interfaces of the target application may include a consistent layout, such that the test device 102 offers binding based on layout of the elements within the interface, whereby binding the component by the tab stop is possible. This binding option may be less preferred, in certain embodiments.

Notwithstanding the above specific examples, it should be appreciated that a number of different options may be employed to bind the test script to the application, whereby the actions, variables, and settings of the test script are properly applied to the application. The binding, in the embodiments herein, is less time consuming than the generating of the test script. As such, even with the binding step of method 600, the application is tested more promptly after completion than if the test script was built off of the built application, rather than the requirements of the application.

After the test script is bound to the target application, the test script is executed according to one or more schedules of the test script, or manually by the user. As the test script is executed, the test device 102 intermittently, or constantly, checks on one or more outputs of the target application (depending on the test script). The particular outputs may simply be values of the output, the presence of particular data in a batch file, a valid interface, etc. Generally, the outputs are checked or tested based on the instructions included in the artifact. For example, when a login is intentionally failed, the artifact may check for a login error message. Further, in the context of the login, the artifact may further test if the password strength matches the requirements, the length of the user name (or format) is correct, the spelling on the fields are correct (in multiple languages if necessary), etc.

In several embodiments, the test device 102 further checks for changes to the outputs of the target application, which are unexpected between revisions of the target application. FIG. 8 illustrates another exemplary method 800 for use in testing a target application. While the method 800 is described herein with reference to the system 100, it should not be understood to be limited to the system 100. Conversely, the system 100 should not be understood to be limited to the method 800, as the system may be employed to perform other different methods, as described herein.

The method 800 generally includes the test device 102 (as indicated by execution of the test script) submitting an input to a target application, at 802. The application device 104, and in particular, the target application 106 responds to the input, by providing an output to the test device 102. The test device 102, at 804, captures the output from the target application 106, and stores, at 806, the output in the test output database 112. The cycle of submitting inputs, capturing outputs, and storing the outputs, as designated by the dotted box 808, is repeated as the test script progresses, for inputs of the test script, and as the test script is repeatedly executed per its schedule, or its manual execution.

The method 800 further includes, in this embodiment, comparing, at 810, the output with a prior output, which is in response to the same input. In particular, because the dataset, in this example, is the same for the present and prior execution of the test script, the outputs are expected to be the same, unless the change is the result of a revision to the target application (or in some instances, the test script). By comparing the two outputs, the test device 102 determines if there are any unexpected changes between the outputs. If an unexpected difference is identified, at 812, the test device 102 generates an observation, at 814. The observation may include an error, an event, or other fact indicating a problem with the output, which may be viewed as the test script is running, or may simply include a flag for the user to review then, or at a later time. If there is no unexpected difference, the test device 102 continues, as defined by the test script, e.g., comparing the next output to a prior output, etc.

FIG. 9A illustrates an example interface 900*a*, which is an output from a target application, in response to a test script, and in particular as a login artifact within a test script. The interface 900*a* was captured and stored on Day X. As shown, the interface 900*a* includes a username field 902, a password field 904, and a login button 906. After a test script is executed on Day X, a developer associated with the target application makes one or more changes to the target application 106, which may be related or unrelated to the login interface 900*a*. When the test script is executed for the target application, on the next day (i.e., Day X+1), an interface 900*b* is captured, by the test device 102, and stored in the test output database 112, as shown in FIG. 8. When the interface 900*b* is compared to interface 900*a*, the test device 102 detects unexpected changes, because a security image 908 is included in the interface 900*b*. The test device 102 may detect the change through a bit-map comparison of the two interfaces (with the prior day's interface 900*a* stored in memory 304), or through a comparison of the HTML code, for example, of the interfaces.

In this manner, the test script, as executed by the test device 102, is suitable to detect defects in the outputs of the application, as compared to prior executions of the test script. This is useful, in certain embodiments, because substantially all of an interface, batch file, or other output is tested for changes, regardless of the particular revision between tests. For example, if an intended change is to alter the format of the column of data within a batch file, checking the format of the column, after the revision, confirms the revision is effective. However, merely checking the column format would not, for example, notice a different part of the batch filing being altered (inadvertently) during the revision. By use of the method 800, for example, described above, the interfaces, batch files, or other outputs, which are provided from the target application in response to the test script, are expected to be identical when no change or revision is made, and being different only as expected from a change or revision. The test device 102 herein, in certain embodiments, reduces the potential for an unexpected change to be included through a change or revision, unless intentional, to the target application.

It should be appreciated that a number of different comparison methods may be used to detect changes in the interfaces, batch files, output values, or other outputs of the target application, as a result of the test script. As outputs from prior executions of the test scripts are stored in the test output database 112, the test device 102 may select the outputs from a prior execution of the test script or, potentially at a test engineer's prompting, outputs from a particular date or interval backwards from the execution of the test script. For example, a test device 102 may compare outputs from a current execution of a test script with outputs from 1 minute prior, or hours, days, weeks, or months prior, in order to check for unexpected changes, or expected changes over particular time intervals.

Further, in at least one embodiment, the test device 102 may omit comparing outputs during certain executions of the test script for one or more reasons. For example, a developer may omit output comparisons depending on the level or type of revision or change being made to the target application. Often, a subsequent execution of the test script, with the output comparisons included, will detect changes between the outputs of the target application. Generally, when the test device 102 omits comparison of outputs, the outputs are not stored, so that when the test device 102 next compares, it will reference (in comparison) the last compared set of outputs from the target application 106.

When the comparison, by the test device 102, detects a change, the change may be expected, based on the change or revision, to the target application 106. The expected changes may either be pre-identified in the test script, or identified in the executed test script through prompting by a developer, similar to the binding interfaces described above. When a change is detected that is neither identified in the test script, nor passed by a developer, an observation, as described above, is generated for the interface, operation, etc., as the test script is executed.

Referring again to FIG. 1, the test device 102 includes an application monitor 114. The application monitor 114, in this embodiment, is executed on the device hosting the target application 106. The application monitor 114 communicates, via network 108, to the test script. FIG. 10 illustrates an exemplary method 1000 for use in testing a target application. The method 1000 is described with reference to the system 100, but should not be understood to be limited to the system 100. Conversely, the system 100 should not be understood to be limited to the method 1000, as the system 100 may be employed to perform other different methods, as described herein.

Method 1000 includes deploying the application monitor 114, at 1002. The application monitor 114 is deployed, in this embodiment, to the application device 104. In other embodiments, the application monitor 114 is deployed, by the test device 102 or user associated with testing the target application 106, to the device in which the target application 106 is hosted. Once deployed, the test device 102 executes a test script, at 1004. As the test script is executed, if an observation is detected by the test device 102, at 1006, the test device 102 communicates an observation flag to the application monitor 114, at 1008. Additionally, or alternatively, during the test script, the test device 102 may communicate a capture flag to the application monitor 114, based on one or more conditions (e.g., milestones in the test script, time/date, etc.) other than an observation, at 1010 (e.g., if an observation is not detected, etc.). In response to either flag, the application monitor 114 captures forensic details from the target application 106 and/or application device 104. Forensic details may include, for example, event logs, systems logs, device logs, settings, memory and/or core dumps, etc. Once captured, the application monitor 114 transmits the forensic details to the test device 102, which, in turn, receives the forensic details, at 1012. The test device 102 further stores the forensic details, at 1014, in test output database 112.

The forensic details are stored as associated with the flag (or underlying observation or condition) or a particular execution of the test script, so that the forensic details may be consulted by a test engineer or other user when investigating the observation or the performance of the target application, in response to the test script. In this manner, the forensic details are captured substantially at the time of an observation or other flag. As such, the test engineer or other user avoids searching for the forensic details at the application device 104, when he/she reviews the performance of the target application 106, at some later time. In various embodiments, the application monitor 114 saves the forensic details from being lost at the application device 104, due to rollover or save over operation, in which the application device 104 keeps forensic details for only so long before saving over them. In addition, because the forensic details are associated with the flag (or underlying observation or condition), the details are efficiently retrievable by the user as needed.

In addition to receiving forensic details from the application monitor 114, the test device 102 also captures one or more outputs from the target application 106, at 1016. In the method 1000, if an observation is detected at 1006, the test device 102 then also stores the captured outputs in the test output database 112, at 1018. The capture outputs are associated with the test script, or execution thereof, so that the outputs may be readily available to a user as needed.

FIG. 11 illustrates a login interface 1100, in the target application 106. In this particular execution of the test script, a user name "user 33" is provided to a User Id field 1102, but no password is added to password field 1104. The target application 106 issues an error, in this example, due to a logical security credentials issue, i.e., invalid or missing password. When the error is recognized by the test device 102, an observation flag is transmitted to the application monitor 114, which captures the system log from the application device 104, as shown in FIG. 12. It should be appreciated that additional forensic details, beyond the system log, may be captured by the application monitor 114 and provided to the test device 102.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) generating, at a computing device, a test script for the target application, based on at least one requirement of the target application, the test script defining at least one input to the target application and associated with the at least one requirement; (b) binding, at the computing device, in response to a user input, at least one element of the target application to at least one input of the test script; (c) comparing an output captured at the first instance and an output captured at the second instance; (d) when a difference is identified, which is unrelated to the revision to the target application, generating an observation; (e) deploying an application monitor; (f) executing a test script directed to the target application during a test interval, the test script defining an input to the target application and at least one expected output when the target application receives said input; (g) identifying an observation when the output of the target application, in response to said input, is different than the at least one expected output; and (h) communicating an observation flag to the application monitor.

In addition to the methods described herein, it should be appreciated that a computer readable media may include instruction, which when executed by at least one processor, because the processor to perform one or more of the methods described and/or claimed below. In particular, computer readable instructions, when executed, may cause at least one processor to: (1) generate a test script for the target application, based on at least one requirement of the target application, and bind, in response to a user input, at least one element of the target application to at least one input of the test script; (2) compare an output captured at the first instance and an output captured at the second instance, and when a difference is identified, which is unrelated to the revision to the target application, generate an observation; (3) deploy an application monitor, execute a test script directed to the target application during a test interval identify an observation when the output of the target application, in response to said input, is different than the at least one expected output, and communicate an observation flag to the application monitor.

Likewise, a system and/or a computing device may include at least one processor configured to perform one or more of the methods described and/or claimed below, and include a memory in which test scripts, outputs, observations, application monitors, etc. are stored.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein, the term "and/or" includes any and all combinations of one or more of the associated listed items.

Although the terms first, second, third, etc. may be used herein to describe various elements and operations, these elements and operations should not be limited by these terms. These terms may be only used to distinguish one element or operation from another element or operation. Terms such as "first," "second," and other numerical terms when used herein do not imply a sequence or order unless clearly indicated by the context. Thus, a first element operation could be termed a second element or operation without departing from the teachings of the exemplary embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in testing a target application, the target application configured to generate at least one output based on at least one input, the method comprising:
   generating, at a computing device, a test script for the target application based on at least one requirement of the target application, wherein generating the test script is prior to or in parallel with a development of the target application, yet apart and separate from the development of the target application such that the target application, or a part of the target application from the development of the target application, is not used in generating the test script, the test script including a schedule of execution of multiple different plans, at least one of the multiple different plans incorporating by reference a plurality of generic artifacts and at least one dataset, at least a first one of the plurality of generic artifacts defining one or more interactions for testing different applications and providing an evaluation of one or more outputs of different applications, the test script defining at least one input to the target application and associated with the at least one requirement, the at least a first one of the plurality of generic artifacts incorporated by reference into a second one of the plurality of generic artifacts in the at least one of the multiple different plans of the test script; and then
   binding, at the computing device, in response to a user input, at least one element of the target application to at least one input of the test script.

2. The method of claim 1, wherein generating the test script is based on multiple requirements of the target application; and
   wherein the test script defines multiple inputs to the target application, each one of the multiple inputs associated with an element of one of the multiple requirements of the target application; and
   wherein binding includes binding each of the multiple inputs of the test script to the associated element of the one of the multiple requirements of the target application.

3. The method of claim 1, wherein each of the at least a first one and at least a second one of the plurality of generic artifacts are scenarios in the test script.

4. The method of claim 1, wherein the at least a first one of the plurality of generic artifacts incorporates the at least one dataset by reference;
   wherein the test script incorporates by reference a second data set; and
   wherein the at least a second one of the plurality of generic artifacts incorporates the second dataset by reference.

5. The method of claim 1, wherein the at least one of the multiple different plans includes at least one epic with at least one story associated with the at least one requirement incorporated by reference into the at least one epic.

6. The method of claim 5, wherein multiple scenarios are incorporated into the at least one story by reference; and
   wherein one of the multiple scenarios includes the at least a first one of the plurality of generic artifacts and a different one of the multiple scenarios includes the at least a second one of the plurality of generic artifacts.

7. The method of claim 1, wherein binding the at least one element to at least one input of the test script includes:
   causing to be displayed, at a user computer device, at least one user interface of the target application, the user interface of the target application including the at least one element of the target application, wherein the at least one element is an aspect of the user interface of the target application;
   causing to be displayed, at the user computing device, a variable interface identifying the at least one input of the test script;
   receiving, at the computing device, a selection of the at least one element of the user interface of the target application within the user interface of the target application, the selection indicating the at least one element of the user interface of the target application is associated with the at least one input of the test script; and
   in response to receiving the selection of the at least one element of the user interface of the target application, appending, at the computing device, an identifier of the at least one element of the user interface of the target application to the test script.

8. The method of claim 7, wherein the variable interface includes at least one option to bind the at least one element of the user interface the target application to the at least one input of the test script.

9. The method of claim 8, wherein the at least one option to bind the at least one element of the user interface of the target application to the at least one input of the test script includes: a name, identifier, attribute and/or definition of the at least one input of the test script.

10. The method of claim 7, wherein generating the test script includes identifying at least one story associated with the at least one requirement and appending the at least one story to the test script as incorporated in the at least one of the multiple different plans and/or as incorporated in a different one of the multiple different plans.

11. The method of claim 10, wherein the schedule of execution is defined over a predefined interval.

12. The computer-implemented method of claim 1, further comprising:
- at a first time, executing the test script for the target application;
- capturing and storing, in a computing device memory, an output from the target application at a first instance, in response to said at least one input to said element of the target application, wherein the output from the target application at the first instance includes a screen-shot and/or a webpage; and then
- at a second later time, executing said test script for a revised target application, the revised target application including the target application having at least one revision prior to the second later time, but after the first time;
- capturing an output from the revised target application at a second instance, in response to said at least one input to said element of the revised target application, wherein the output from the revised target application at the second instance includes a screen-shot and/or a webpage;
- comparing said output captured at the first instance and said output captured at the second instance; and
- generating an observation when a difference is identified, which is unexpected in view of the at least one revision to the target application.

13. The method of claim 12, wherein comparing said output captured at the first instance and said output captured at the second instance includes comparing code associated with the screen-shots and/or the webpages.

14. The method of claim 12, wherein comparing said output captured at the first instance and said output captured at the second instance includes an image comparison of the screen-shots and/or the webpages.

* * * * *